Aug. 4, 1953

R. W. BOYDSTON ET AL 2,647,441

FRONT SURFACE MIRROR IMPROVED BY TRANSPARENT
PROTECTIVE OVERCOATING

Filed April 27, 1945

Inventors
RAYMOND W. BOYDSTON.
ALLEN J. ESHNER.

By C. E. Herrstrom + H. E. Thibodeau
Attorneys

Patented Aug. 4, 1953

2,647,441

UNITED STATES PATENT OFFICE 2,647,441

FRONT SURFACE MIRROR IMPROVED BY TRANSPARENT PROTECTIVE OVERCOATING

Raymond W. Boydston and Allen J. Eshner, Philadelphia, Pa.

Application April 27, 1945, Serial No. 590,571

4 Claims. (Cl. 88—105)

(Granted under Title 35, U. S. Code (1952), sec. 266)

The invention described herein may be manufactured and used by or for the Government for governmental purposes without the payment to us of any royalty thereon.

Our invention relates to mirrors having reflecting front surfaces comprised of aluminum, silver or other suitable metal or non-metal substances and it has special reference to means for improving the mechanical durability and the optical reflectivity of these reflecting films and for otherwise extending the usefulness of such mirrors.

Broadly stated, the object of our invention is to increase the reflectivity of metallic or other front surface mirrors while enhancing their ability to resist deterioration.

A more specific object is mechanically to protect the metallic or other films of such mirrors without detracting from the light reflecting efficiencies of those films.

Another object is to harden and increase the resistance of such films to abrasion, corrosion and tarnishing while at the same time rendering them even more efficient as reflectors of light rays within the visible spectrum.

A further object is to increase the practicability of silver, aluminum and other substances for front surface mirror use.

A still further object is to enhance the useful properties of partially reflecting mirrors wherein either metallic or non-metallic reflecting films are utilized.

In practicing our invention we attain the foregoing and other objects by overlaying the mirror's reflecting film with a protective coating of magnesium fluoride (or other equivalent transparent substance) firmly adhered to the film's surface as by baking thereon in a vacuum and having an optical thickness so uniquely dimensioned that light rays reflected by the coating will be in phase with those reflected by the underlying material and thereby add to the mirror's total reflecting efficiency.

The latter condition has been discovered by us to be met when the overcoating's optical thickness is substantially one-half or an exact multiple of one-half the wave length of that part of the visible spectrum to which the human eye most intensively responds. A magnesium fluoride overcoating having this critical thickness is found to increase both the mechanical ruggedness and the luminous reflectivity of the mirror's reflecting film while preserving all other desirable characteristics originally had thereby.

Our invention itself, together with additional objects and advantages, will best be understood from the following description of illustrative embodiments when considered with the accompanying drawings wherein.

Figure 3:
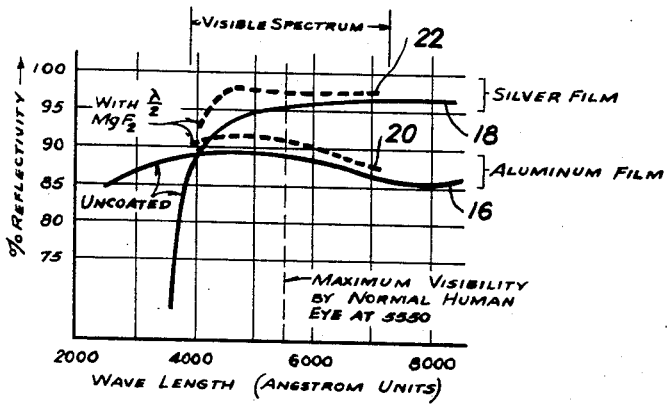
Figure 4:
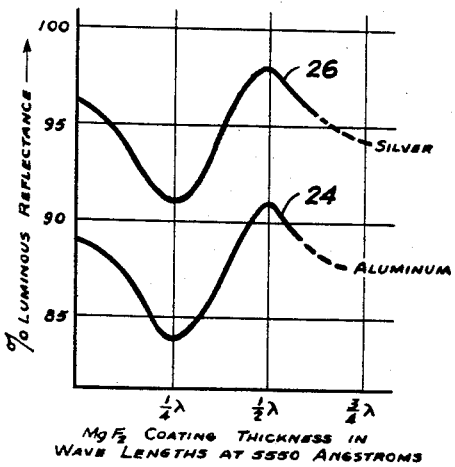
Figure 5:
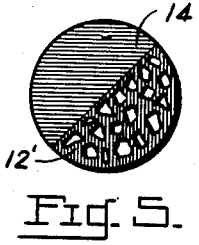
Figure 6:
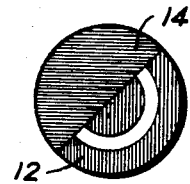

Fig. 3 indicates the light reflectance properties of aluminum and silver mirror surfaces both before and after the improvements of our invention have been applied thereto;

Fig. 4 shows how variation in magnesium fluoride overcoating thickness alters the reflectance efficiency of the underlying metallic film; and Figs. 5–6 represent test specimens by which the superior mechanical characteristics of our new product have been demonstrated.

The mirrors to be improved

The improvements of our invention are applicable to front surface mirrors of a wide variety of types and having a wide variety of sizes, shapes and contours. One such mirror is illustratively shown in Figs. 1–2 as comprising a base 10 of glass or other material which carries on its front surface a satisfactorily adhered coating or film 12 of aluminum, silver or other substance (either metal or non-metal) that has acceptable light reflecting properties. When film 12 is of metal a satisfactory thickness for "totally" reflecting mirrors is of the order of 800 to 1000 Angstrom units or about 0.000008 centimeter. A much thinner film is, of course, used by "partially" reflecting mirrors.

The mirrors to be benefited by our improvements may have this reflecting coating 12 deposited upon the base or blank 10 by any of a number of well known techniques. One of these offering superior results through thermal evaporation of aluminum on glass in a vacuum in at least two steps is more fully described by U. S. Patent 2,443,196 which issued on June 15, 1948, to Raines-Boydston-Eshner for "Process for Making Front Surface Mirrors and Product Thereof."

The resulting and other front surface mirrors now to be improved by use have their aluminum, silver or other reflecting films 12 directly exposed. Such exposure leaves the film without protection against corrosion and tarnish due to atmospheric contact and without safeguard against the abrasion, scratching and other injurious effects that result from cleaning and necessary mechanical handling.

In accordance with our invention all disadvantages resulting from such exposure are effectively overcome while the mirror's light reflecting efficiency is not only fully maintained but also appreciably increased. These benefits are realized not only by "totally" reflecting mirrors that utilize metallic films 12 of sufficient thickness to block light transmission therethrough, but also by "partially" reflecting mirrors that use either metallic or non-metallic films (such as of titanium dioxide) which reflect only a portion of the received light and transmit much or all of the remainder therethrough.

For purposes of illustration front surface mirrors coated with aluminum and with silver have been chosen as the basis for explaining our improvements. As the description hereof proceeds it will become apparent, however, that these improvements also are applicable to front surface mirrors coated with other metals, with compositions of two or more different metals, or with non-metallic reflecting substances.

The unique overcoating of our invention

Figure 1:
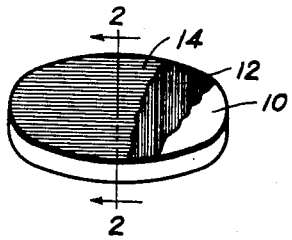
Fig. 1 represents a metallic front surface mirror provided with the reflectance-increasing overcoating of our invention.
Figure 2:
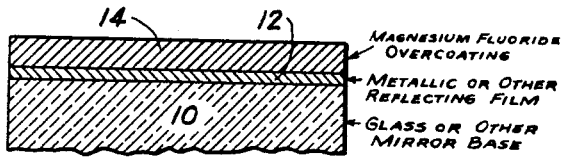
Fig. 2 is an enlarged section on line 2—2 showing further details of the mirror of Fig. 1.

In accordance with our invention metallic or other front surface mirrors such as are shown at 10—12 in Figs. 1-2 are supplemented by an overcoating of mechanically rugged and optically transparent material 14. Preferably this material is magnesium fluoride vacuum baked on or otherwise tenaciously adhered to the surface of film 12. Other fluoride salts such as calcium fluoride also may be used to form this overcoating 14. Some of these compounds are, in fact, found to offer even better optical properties than does magnesium fluoride but the resulting coated products are not so satisfactorily hardened nor as durable.

Our inventive improvements are predicated on discovery by us that certain critical thicknesses of magnesium fluoride not only restore the mirror's reflectivity completely to its uncoated value but also effect a definite increase of the order graphically shown by Fig. 3.

The "aluminum" and "silver" full-line curves 16 and 18 of Fig. 3 set forth reflectance information based on the findings of others in the field and confirmed by careful spectrophotometric measurements made by us with a General Electric recording spectrophotometer and also with a Beckman spectrophotometer. Each of the named metals reflects light at relatively high efficiency throughout the visible spectrum range of light wave lengths. Thus at 5550 Angstrom units, where the normal human eye has its maximum visibility, a freshly deposited aluminum film is shown by curve 16 to give about 89% luminous reflectivity and a freshly deposited silver film is shown by curve 18 to give about 96% luminous reflectivity.

Overcoating of the aluminum film by our novel half wave length thickness of magnesium fluoride further increases the film's reflectance to the elevated value shown generally by the dotted curve 20. This curve indicates that at a wave length of 5550 Angstrom units the aluminum film's reflectance has now been raised from about 89% to approximately 91%. In the case of silver corresponding improvements are achieved. Thus curve 22 indicates that at 5550 Angstroms the overcoating raises the silver film's reflectance from about 96% to about 98%.

Reflectance of the metallic film has been discovered by us to vary with change in overcoating thickness in the manner shown generally by Fig. 4. There curve 24 has been plotted for aluminum at 5550 Angstroms and curve 26 has been plotted for silver at the same midpoint in the visible spectrum. The reflectance at this midpoint wave length has been found by us to almost exactly duplicate the "integrated" white light reflectance for mirrors of the type now considered.

In the case of each of the two named illustrative metals, we have observed that very thin overcoatings of the magnesium fluoride serve to reduce the film's luminous reflectance, bringing it to a minimum when the overcoating's optical thickness attains one quarter the wave length of 5550 Angstrom units. Further increases in the overcoating's thickness now cause the metal film's reflectance to rise, bringing it to a maximum when the magnesium fluoride attains an optical thickness of one-half the wave length just mentioned. This corresponds to an optical thickness of about 0.000027 centimeter.

Still further increases in overcoating thickness again bring the reflectance down in the general manner also indicated by curves 24 and 26, and as the thickness is additionally built up these two curves tend to repeat themselves. Thus the next minimum reflectance is reached at approximately three-quarters wave length optical thickness; the next maximum at one full wave length thickness; and so on.

Our here disclosed novel use of the magnesium fluoride overcoating 14 optically dimensioned to a critical thickness of one-half the wave length of light having greatest visibility to the human eye thus is radically different from all prior art uses within our knowledge, the purpose of which has been to reduce light reflectivity of unfilmed glass or other optical surfaces. To accomplish this reflection reduction a layer of magnesium fluoride or other similar substance having an optical thickness equal to an odd number of quarter wave lengths of light has been used.

Such practice effects this diminution because the just named "quarter wave length" optical thickness of the fluoride layer causes light rays which are reflected from the air-film surface of the material to be out of optical phase with the rays which are reflected from the film-glass surface. Reflection of each set of rays is occasioned by passage of light from one medium to another, each having different indices of refraction. The result is that the two named sets of reflected rays tend to "cancel" thereby diminishing the resultant reflectance and accomplishing a reduction of reflected light.

In contradistinction to the reflection reduction produced by the prior art applications we here propose the use of magnesium fluoride or equivalent substance applied to a mirror surface and having a different optical thickness so uniquely chosen as to increase the mirror's total reflectance. As a matter of experimental fact, already made obvious by the curves of Figs. 3 and 4 we have achieved a definite increase in the reflectivity of aluminum and silver mirrors by our inventive process.

Magnesium fluoride coating process

Others skilled in the optical arts have determined the value of baking deposits of magnesium fluoride on glass or other dielectric surfaces to be thus coated. As previously pointed out, the prior art object in using such coatings was to reduce reflectance from these surfaces. The recommended temperature of such baking process has ranged between 300° and 500° C.

A further advancement to the techniques for applying such fluoride films recently proposed is to carry out this high temperature baking process in a vacuum. Preferably the optical element to be coated is pre-heated in the vacuum before deposit of the fluoride is begun. Heating then is continued through the depositing stage.

In order to obtain the best results in utilizing our own inventive improvements we have found this vacuum baking process to give the most satisfactory results. Use of this procedure of coating metallic reflecting surfaces with a half wave length optical thickness of magnesium fluoride will produce the most durable and highly reflecting mirrors yet devised.

While the high temperature vacuum baking process for applying the magnesium fluoride coating is an important step in utilizing our inventive improvements, it of itself is not herein claimed as new. The crux of our new improvement lies in our original use of a half wave length optical thickness of vacuum baked magnesium fluoride on metallic front surface mirrors (as distinguished from the light-transmitting surfaces above discussed), and not in the particular method of applying the fluoride coating. Any technique of application which produces a hard, tenacious, durable and otherwise satisfactory overcoating 14 may therefore be used.

Advantages of new technique and product

As described in the previously mentioned earlier U. S. Patent 2,443,196, mirrors made with aluminum or other metals having high reflectivity have heretofore been comparatively soft. Such mirrors were found to suffer hairline scratches when rubbed with lens tissues, dry cloth and the like. In addition, the resistance to corrosion caused by various atmospheric conditions and accelerated weathering tests was very low.

The new process for making such mirrors described by U. S. Patent 2,443,196 had the effect of producing a mirror relatively harder and more resistant to corrosion than by any methods then known. Our present improvement even further enhances these important characteristics of mirrors, furnishing a reflecting surface far superior in these two properties than any prior art product and additionally giving reflectivity efficiencies of the elevated values indicated by Fig. 3.

Metallic front surface mirrors provided with the unique overcoating 14 of our invention are characterized by numerous superior qualities which make the improved mirrors highly satisfactory for all applications. Among these enhanced qualities mention may be made of the following.

Elevated reflectivities

Aluminum films 12 deposited on mirror blanks and covered with our half wave length thickness of magnesium fluoride overcoating 14 offer reflectivities of the elevated order earlier discussed and shown by curve 20 of Fig. 3. Reflectometer tests show over 91% white light reflectance by front surface mirrors of our overcoated aluminum reflecting film type. This is substantially higher than the previously attainable maximum of 89% which curve 16 shows.

Silver films 12 deposited on mirror blanks and similarly overcoated by magnesium fluoride offer reflectances of the still further elevated order shown by curve 22 of Fig. 3. Reflectometer tests show 90% white light reflectance by such improved silver mirrors. This is substantially 2% higher than the previously attainable maximum of 96% which curve 18 shows.

Increased resistance to corrosion

Exposure of front surface and other mirrors to widely varying temperatures and conditions of atmosphere calls for a reflecting film which is highly resistant to corroding influences. Unprotected aluminum resists oxidation and tarnish fairly well. Unprotected silver, however, does not; and past attempts to utilize silver as a front surface film material have universally failed because of the high rate at which silver tarnishes even when exposed to ordinary atmosphere.

The magnesium fluoride overcoating 14 of our invention completely overcomes these difficulties. By protecting the mirror's metallic film 12 from atmospheric and other contact it makes silver a thoroughly practical material for front surface mirror use and it vastly increases the durability of both silver and aluminum in front surface mirror applications.

Thus, both aluminum and silver mirrors overcoated as herein described are found successfully to withstand prolonged temperatures ranging from −60° F. to +160° F. and repeated cycles thereof without damage of any kind. Such improved mirrors, moreover, successfully undergo a "distilled water" test wherein a drop of distilled water is placed on the mirror's surface, allowed to dry normally, and then cleaned therefrom by conventional methods to determine whether the mirror film is removed or deteriorated at this spot. No damage to the overcoating 14 or the underlying metal 12 can be done in this way.

One further well known measure of a reflecting film's resistance to corroding influences takes the form of a "salt atmosphere" test wherein the mirror's surface is subjected to a saturated atmosphere of salt water at some predeterminately high temperature such as 35° C. Both coated and uncoated silver mirrors subjected to this test showed no damage after 24 hours. When immersed in saturated salt water at 75° C., however, the uncoated silver mirror was severely damaged in five minutes, whereas the coated silver mirror withstood this immersion for 25 minutes without evidence of damage.

Uncoated aluminum mirrors subjected to the foregoing "salt atmosphere" test were consistently ruined in less than 5 hours. Aluminum mirrors protected by the magnesium fluoride coating of our invention withstood the salt atmosphere for over 400 hours with no signs of damage. An aluminum mirror test specimen coated over half its surface only as shown in Fig. 5 was exposed to the spray for 24 hours. At the end of that period the specimen's uncoated area was largely eaten away as shown at 12' in Fig. 5 while the coated aluminum remained untouched as shown at 14.

Other evidences of the high resistance to corrosion possessed by our improved mirrors have been shown by exposure to hydrogen sulfide bubbled through water. Uncoated silver mirrors are ruined in less than three minutes. When protected by the magnesium fluoride overcoating 14 of our invention the same mirrors showed no damage after 45 minutes. Aluminum mirrors protected by our new overcoating also stood the same test for 45 minutes without damage.

Strong acids also have been used to demonstrate the comparative corrosion resistance of metallic front surface mirrors before and after our overcoating 14 is applied thereto. Exposure of an uncoated aluminum mirror to a sulphuric acid solution of 20% concentration resulted in slight damage after 5 minutes; similar exposure of a coated aluminum mirror produced no damage after 20 minutes. Immersion of an uncoated aluminum mirror in a hydrochloric acid solution of 20% concentration caused removal of large spots of the metal after 2½ minutes; a coated aluminum mirror showed no damage from the same acid after 5 minutes. Exposure of an uncoated aluminum mirror to a nitric acid solution of 20% concentration was made for 10 minutes after which the mirror was washed under running water and dried with acetone (without rubbing). The mirror was completely ruined. A coated aluminum mirror given the exactly same treatment showed no damage whatever.

Still further evaluations of corrosion resistance have been made with concentrated solutions of strong bases such as potassium hydroxide and sodium hydroxide at room temperature. An uncoated aluminum mirror was completely destroyed after only 23 seconds' immersion in the concentrated potassium hydroxide; a coated aluminum mirror showed much less damage after 1200 seconds. An uncoated mirror freshly aluminized had its metal film completely removed at the end of 15 seconds immersion in the concentrated sodium hydroxide; an uncoated aluminum mirror which had been aged for one year required one minute for complete destruction by the sodium hydroxide; but a coated aluminum mirror withstood immersion for 300 seconds (5 minutes) with no damage.

*Overcoating tenaciously adhered to metallic film*

Our improved mirrors are characterized by tenacious adherence of the magnesium fluoride overcoating 14 to the metallic reflecting film 12. One reliable measure of such adherence is the "Scotch tape" test. It consists in carefully placing the sticky surface of clean Scotch tape over the mirror's coated film, rubbing it firmly thereagainst throughout all areas of contact, pressing one side of the tape over the mirror blank's edge and then slowly ripping the tape from the mirror. Successful passage of the test requires that no part of the overcoating 14 be removed with the tape.

The mirror surfaces 14—12 resulting from the process of our invention consistently pass this test and it is impossible by this means to separate the overcoating 14 from the metallic film 12. The tenacity of this adherence is found to be equal to or even greater than the tenacity with which the metallic film 12 can be adhered to the mirror blank 10. Aluminum thermally evaporated upon glass as described by U. S. Patent 2,443,196 adheres with such firmness the Scotch tape is ineffective for separating the film 12 from the base material 10. Mirrors made per Patent 2,443,196 thus consistently pass the Scotch tape test both before and after the magnesium fluoride overcoating 14 of our present invention is applied to the metallic film 12. Silver mirrors made by us successfully withstand the same Scotch tape test both before and after the overcoating 14 is applied.

*Increased hardness and abrasion resistance*

Metallic front surface mirrors of both aluminum and silver are by the magnesium fluoride overcoating 14 of our invention rendered exceedingly hard and highly resistant to abrasive action. Both silver and aluminum, like other metals of high reflectivity, are comparatively soft and front surface mirrors of the prior art are found to receive objectionable hairline scratches and removal of the metal when rubbed with lens tissue, dry cloth or the like.

The mirrors of our present invention offer outstanding improvement in this respect for in them the surface of the magnesium fluoride overcoating 14 is sufficiently harder than the film metal therebeneath to withstand vigorous cleaning, rough handling, and other severe mechanical abuse without scratching or producing deterioration of any kind.

This is borne out by a "rub" test wherein dry cheesecloth is forcefully urged against a small area of the mirror's surface between the blank's center and periphery while the blank is rotated. The resulting circular rubbing tends to abrade the surface and wear same away. Applying this test to a completely uncoated aluminum mirror wore the contacted surface completely away after only 20 rotations of the mirror blank. Application of the same test to an aluminum mirror of the same quality which had been given the magnesium fluoride overcoating 14 of our invention failed to produce any visible damage to the contacted surface after the blank had been rotated 2000 times. A coated silver mirror also withstood 2000 rub rotations without damage; an uncoated silver mirror had its metal completely removed by only two rub rotations.

Further subjected to the "rub" test were a number of aluminum and silver mirror specimens to only half the area of which the overcoating 14 was initially applied as shown in Fig. 6. At the end of 12 rotations of such an aluminum mirror specimen slight but visible (and rejectable) damage had been done to the uncoated area 12 only; after 50 rotations of the specimen many small arc lines completely through the metal had been made into the uncoated area but the coated surface still remained intact and undamaged; and after 100 rotations the contacted uncoated metal 12 had been completely removed by the cheesecloth as shown in Fig. 6 while the coated area 14 still was unharmed and completely free from hairline scratches. Uncoated silver is shown by this test to be softer and even less adherent than aluminum; but, when coated the silver has mechanical durability comparable to that of coated aluminum.

This demonstrated quality of resistance to rubbing makes these mirrors satisfactorily cleanable by the rough cleaning methods which must be resorted to under conditions of military and other service in the field.

*Optional refinements*

All coating thickness definitions thus far made herein have assumed: (a) normal incidence of the light; and (b) daylight use of the mirrors. Under these conditions the stated half wave length optical thickness of the magnesium fluoride overcoating 14 is ideal and results in maximum reflectance efficiencies.

When, however, the illumination is so reduced as to typify night uses of mirrors, the normal human eye responds most intensively to wave lengths somewhat shorter than the 5550 Angstroms previously stated. For light so weak as to make vision barely perceptible the human eye's maximum response thus is found to be at 5100 Angstroms. Such a thickness is slightly less than the optimum "daylight use" value of one-half wave length at 5550 Angstroms.

Moreover, when the light rays to be reflected strike the mirror at angles other than at "normal" incidence (perpendicular to the surface), the distance traveled in reaching the metal 12 beneath the overcoating is defined by an inclined path that becomes somewhat longer than the normal or perpendicular path through the overcoating. At an incidence of 45°, for example, this distance will have increased by a few percent. To achieve maximum reflectance efficiency under this condition, overcoating 14's thickness will require sufficient lessening to make the inclined light path distance through the overcoating equal to the one-half wave length optimum optical value.

*New improvements distinguished from the prior art*

As earlier indicated herein, our present improvements are clearly to be distinguished from the techniques and products of the prior art which involve the use of similar materials but in dissimilar manner so as to achieve entirely different results.

It has long been known that the surface reflection of light from an optical medium like glass can be reduced by coating same with certain transparent materials such as magnesium fluoride to an optical thickness equal to an odd number of quarter wave lengths of light. Others have proposed methods of applying such a coating of magnesium fluoride by baking it on under high temperatures in a vacuum to increase the hardness and otherwise protect the glass or other light transmitting material therebeneath.

Our invention is not concerned with the problem of reducing reflection of light striking an optical surface but rather to attain the maximum possible reflection from mirror reflecting surfaces. To the prior art knowledge of the capacities of metals such as aluminum and silver to reflect light rays we have contributed information which enables such mirrors to attain the excellent durable qualities possessed by the above described magnesium fluoride coating, while at the same time not only fully maintaining but even increasing their original reflection efficiencies.

Previous to our development the optical art is not known to have utilized an overlaid film of magnesium fluoride to harden and otherwise protect the relatively soft metal coatings of mirrors. This is probably because all past experiences indicated that such an overlaid film or coating tended to reduce reflection in the manner confirmed by the lower lobes of our Fig. 4 curves.

*Summary*

By our unique use of a half wave length thickness of vacuum baked magnesium fluoride we have improved both the mechanical durability and the optical reflectivity of metallic and other front surface mirrors. As earlier brought out, light rays striking this half wave length thickness of the fluoride layer 14 appear to be reflected in phase with the light which is reflected from the aluminum or silver layer 12 therebeneath. The occurrence of this additive effect is believed to be responsible for the previously described increase in reflectivity which develops when aluminum, silver or other front surface mirrors are coated with the magnesium fluoride layer.

We find, moreover, that desired reflectivity and hardness increases may be accomplished not only by application of a half wave length thickness of magnesium fluoride but also by other exact multiples thereof such as twice and three times the half wave length value. However, for best results (maximum reflectivity increases) and simplicity of application the use of the half wave length optical thickness is preferable.

The foregoing description makes apparent the marked advantages afforded front surface mirrors by utilization of our improved overcoating technique. Our invention makes possible what may be considered the first thoroughly "practical" use of front surface mirrors, as our product is capable of being handled without any special care and it will long outlast all of its predecessors in the art. In effect, what we accomplish by our invention is to make a front surface mirror having all the durable, handleable and protective qualities of a back surface mirror, but eliminating the distortions, other light path interference and absorptions by the glass resulting in reflection losses caused when light rays are required to pass through a glass medium before and after striking the metallic reflecting surface of the latter type mirrors.

Besides increasing the mirror's hardness, other advantages of our magnesium fluoride technique are the increased reflectivity and ability to resist deterioration earlier described plus the additional protection given to mirrors against tarnishing. This avoidance of tarnish is especially significant in connection with silver reflecting films.

Freshly deposited silver has a far better reflectivity than aluminum or other metals but its ready reaction with the hydrogen sulfide in the air to form black silver sulfide has precluded all possibility of use in front surface mirrors. Our unique magnesium fluoride overcoating 14 applied to a silver reflecting surface 12 eliminates occurrence of such tarnishing by preventing the hydrogen sulfide in the air from contacting the metallic layer therebeneath. By our new technique it thus is now possible to preserve for long periods the brilliant luster possessed by such silver mirrors when they are newly made.

The benefits accruing to the "totally" reflecting mirrors illustratively described herein also may be extended to "partially" reflecting mirrors that use either metallic or non-metallic films (such as of titanium dioxide) which reflect only a portion of the received light and transmit much or all of the remainder therethrough. Application of the novel magnesium fluoride overcoating 14 of our invention to such mirrors greatly augments their mechanical durability while at the same time increasing their overall optical efficiency.

From the foregoing it will be apparent that we have made highly practical improvements in mirrors having on the "first" or front surfaces thereof light reflecting films of aluminum, silver or other suitable metal or non-metal substances; that we have improved the reflectivity of metallic and other front surface mirrors while enhancing their ability to resist deterioration; that we have mechanically protected the reflecting films of such mirrors without detracting from the light reflecting efficiencies of those films; that we have hardened and increased the resistance of such films to abrasion, corrosion and tarnishing while at the same time rendering them even more efficient as reflectors of light rays within the visible spectrum; that we have increased the practicability of silver, aluminum and other substances for front surface mirror use; and that we have enhanced the useful properties of partially reflecting mirrors wherein either metallic or nonmetallic reflecting films are utilized.

Our improvements are therefore extensive in their adaption and are not to be restricted to the specific form here disclosed by way of illustration.

We claim:

1. The method of treating a metallic front surface mirror to improve the mechanical durability and increase the light reflectance thereof which comprises depositing upon the reflecting metal film constituting the mirror surface a tough and durable transparent protective layer of magnesium fluoride having an optical thickness substantially one half or an exact multiple of one half a selected wave length of the light which the mirror is to reflect whereby visible rays thereof reflected by said layer will be so in phase with those reflected by the underlying metal film that the mirror's total light reflecting efficiency will thereby be added to.

2. In a mirror, a blank of base material, a film of reflecting metal carried by the front surface of said blank, and a tough and durable transparent protective coating of magnesium fluoride covering the surface of said reflecting film in thickness substantially one half or an exact multiple of one half a selected wave length of the light which the mirror is to reflect and serving to reflect visible rays thereof in phase with those reflected by the underlying metal film whereby to add to the mirror's total light reflecting efficiency.

3. A mirror having a reflecting front surface and comprising, a base of an optical medium, a reflecting metallic film on the front surface of said base, and a hard overcoating of magnesium fluoride tenaciously adherent to and protecting the front surface of said film, said overcoating having an optical thickness selected from the group comprising one-half ($\frac{1}{2}$), three halves ($\frac{3}{2}$), and five halves ($\frac{5}{2}$) of a wave length of light selected from the range of from 3800 to 7500 Angstrom units, whereby a maximum of light is reflected by said front surface.

4. A process of coating a mirror blank to secure a front surface thereon having maximum reflectivity, including, depositing a thin film of reflecting metallic material on to the front surface of a mirror blank, next depositing an overcoating of magnesium fluoride on the front surface of said film to such a thickness that the finished overcoating has an optical thickness selected from the group comprising one-half ($\frac{1}{2}$), three halves ($\frac{3}{2}$), and five halves ($\frac{5}{2}$) of a wave length of light selected from the range of from 3800 to 7500 Angstrom units, and then baking said overcoating to hardness at a temperature between 400° and 800° F. in vacuum.

RAYMOND W. BOYDSTON.
ALLEN J. ESHNER.

References Cited in the file of this patent

UNITED STATES PATENTS

| Number | Name | Date |
|---|---|---|
| 2,079,784 | Williams | May 11, 1937 |
| 2,220,861 | Blodgett | Nov. 5, 1940 |
| 2,281,474 | Cartwright | Apr. 28, 1942 |
| 2,281,475 | Cartwright | Apr. 28, 1942 |
| 2,366,516 | Geffcken et al. | Jan. 2, 1945 |
| 2,394,533 | Colbert | Feb. 12, 1946 |
| 2,398,382 | Lyon | Apr. 16, 1946 |

OTHER REFERENCES

Kollmorgen (Publ.), Trans. of Ill. Eng. Soc., vol. 11, 1916, pages 220 to 234. (Copy in Division 7 in R&R.)

Pfund (Publ.), "Highly Reflecting Films of Zinc Sulfd," Journal of the Optical Society of America, No. 4, vol. 24, April 1934, pages 99 to 102. (Copy in Division 7 in R&R.)

Strong (text), Procedures in Experimental Physics (1939), published by Prentiss Hall, pages 186 and 187. (Copy in Division 7 in R&R.)

Edwards (Publ.), "Interference in Thin Metallic Films," Physical Review, vol. 38, July 1, 1931, pages 166 to 173. (Copy in Division 7 in R&R.)